United States Patent [19]

Pilarski et al.

[11] 4,031,344

[45] June 21, 1977

[54] INTEGRAL HINGE SENSING SWITCH

[75] Inventors: Regis Victor Pilarski, Utica; Robert John Rumpf, Grosse Pointe, both of Mich.

[73] Assignee: The Firestone Tire & Rubber Company, Akron, Ohio

[22] Filed: Mar. 15, 1976

[21] Appl. No.: 667,263

[52] U.S. Cl. .................... 200/61.58 B; 200/52 R; 200/246; 200/283; 200/294; 200/329

[51] Int. Cl.² .................................................. H01H 3.16

[58] Field of Search ............ 200/52 R, 61.15, 61.16, 200/61.58 B, 159 A, 283, 284, 293–296, 159 B, 329–340; 242/107.4 R, 107.4 E

[56] References Cited

UNITED STATES PATENTS

| 2,192,296 | 3/1940 | Boynton | 200/159 B |
|---|---|---|---|
| 3,172,981 | 3/1965 | Loesch | 200/284 X |
| 3,504,336 | 3/1970 | Boblitz | 200/61.16 |
| 3,519,771 | 7/1970 | Burns | 200/61.16 X |
| 3,548,131 | 12/1970 | Piber | 200/295 X |
| 3,597,564 | 8/1971 | Lewis | 200/296 |
| 3,614,359 | 10/1971 | Beck et al. | 200/283 X |
| 3,749,872 | 7/1973 | Foster | 200/159 A X |
| 3,763,341 | 10/1973 | Willis | 200/283 X |

Primary Examiner—James R. Scott
Attorney, Agent, or Firm—Miller, Morriss and Pappas

[57] ABSTRACT

An integrally formed sensing switch for use with a seat belt retractor assembly and having a housing portion provided with an integrally hinged seat belt follower push arm plate adapted for pivotal movement in association therewith. The push arm plate has a fixed actuator pin extension on the lower surface thereof which selectively extends into the housing in response to movement of the push arm plate and depresses a spring leaf contact element provided in the housing portion so as to selectively open and close an electrical sensing circuit made thus responsive to spool condition as webbing is extended or webbing is retracted. The upper surface of the push arm plate engages the outer surface of seat belt webbing coiled on the retractor spool and is biased to move therewith as the seat belt pays into and out of the retractor assembly.

6 Claims, 14 Drawing Figures

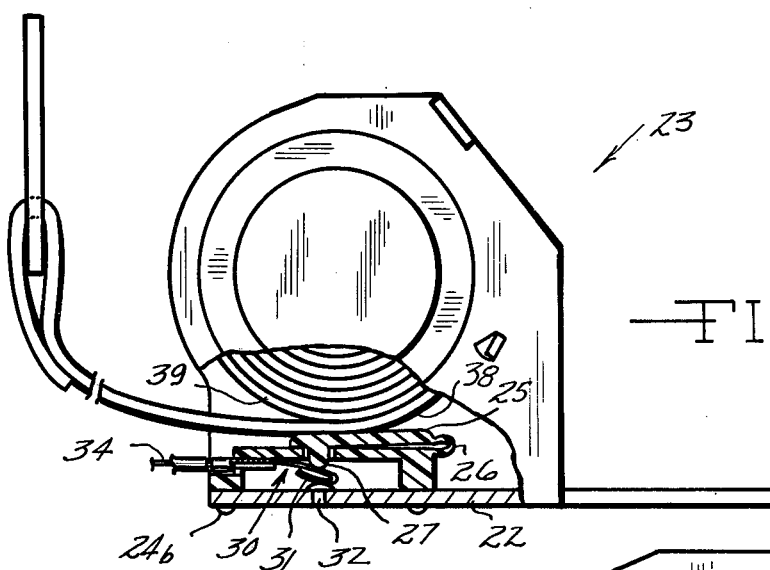
FIG. 11
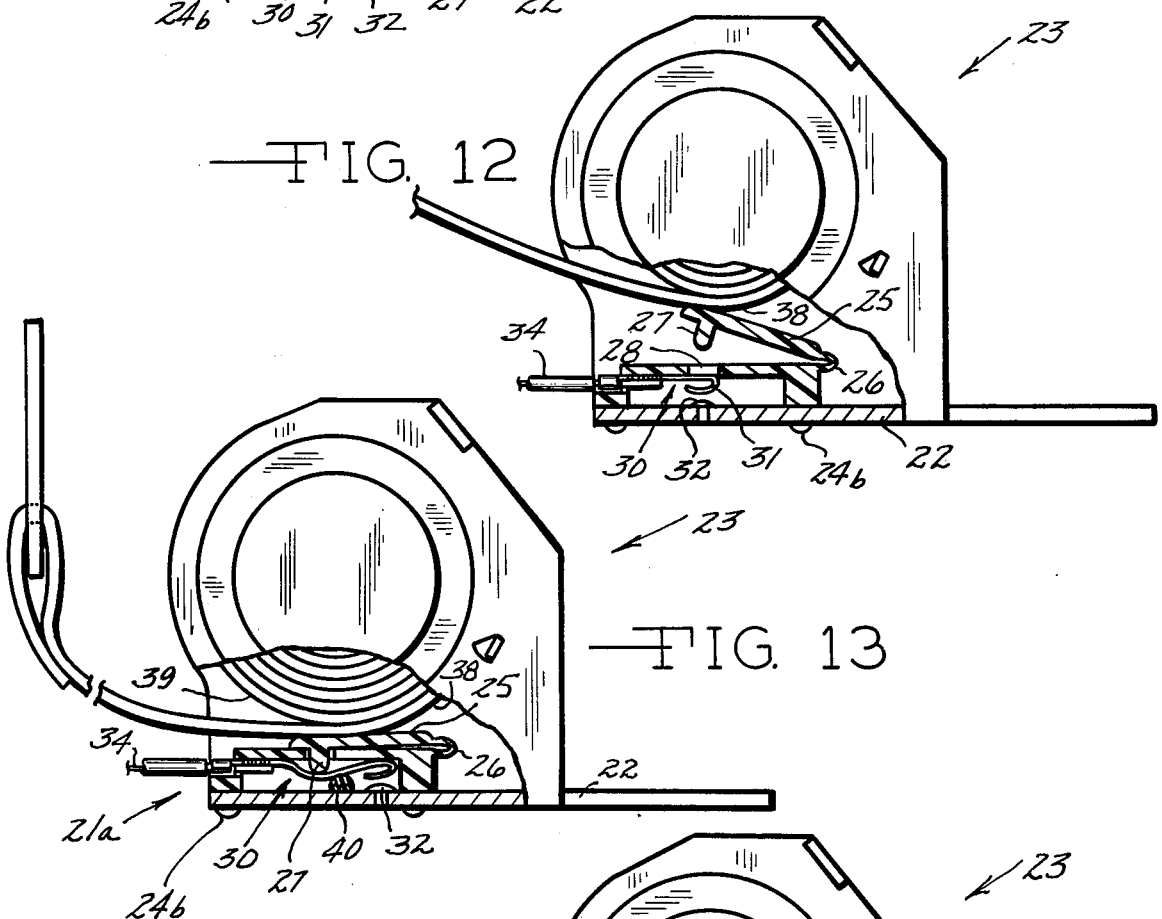
FIG. 12
FIG. 13
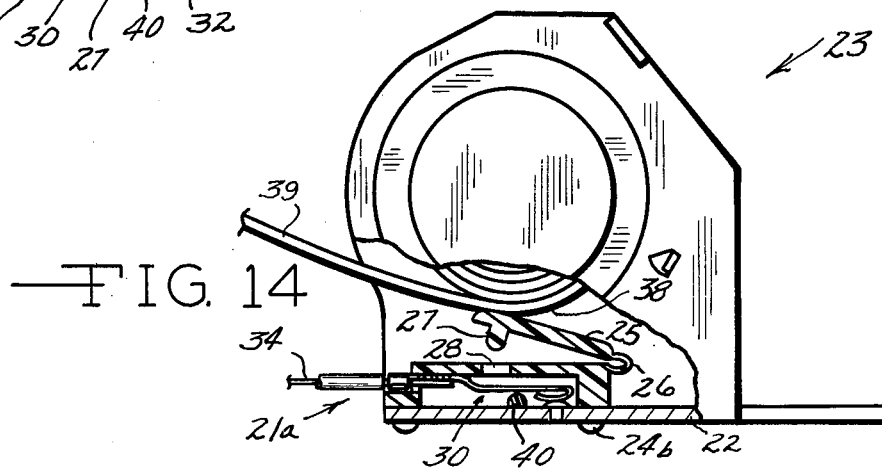
FIG. 14

4,031,344

INTEGRAL HINGE SENSING SWITCH

BACKGROUND AND BRIEF SUMMARY OF INVENTION

This invention relates to an integral hinge sensing switch for use with a seat belt retractor storage assembly so as to automatically sense and indicate spool condition. More specifically, the sensing switch assembly is provided with an integral hinge seat belt follower push arm plate which is adapted to followably engage the outer surface of seat belt or webbing coiled on the retractor assembly spool and be movable in response to changes in the diameter of the coiled seat belt as the seat belt pays into and out of the seat belt retractor assembly. As the seat belt moves into a full spool condition within the retractor assembly, the outer surface of the coiled seat belt depresses the push arm plate so that the actuator pin extension provided thereon extends into the switch housing to movably engage a spring leaf contact element so as to selectively open and close an electrical sensing circuit.

A need has existed for a simple, inexpensive, easily fabricated and fool-proof sensing switch for use in connection with a seat belt retractor assembly to sense and indicate spool condition when the seat belt is in its fully stored position or extended to a selected degree within the seat belt retractor assembly.

It is therefore an object of this invention to provide an integral hinge sensing switch for use with a seat belt retractor assembly to sense and indicate spool condition.

Another object of this invention is to provide a sensing switch having an integrally hinged seat belt follower push arm plate adapted for pivotal movement in association therewith in response to pressure exerted thereagainst by coiled seat belt webbing on the spool of a seat belt retractor assembly.

Another object is to provide a resin switch housing an actuating cover having an integral hinge therebetween and the cover being biased open and to be closed registrably and hingeably by webbing as it builds on a retractor spool.

Yet another object of this invention is to provide an integral hinge sensing switch having a pivotally mounted seat belt follower push arm plate provided with an actuator pin extension which is biased toward an open position with respect to the switch housing adapted to extend into the switch housing to selectively actuate a spring leaf contact to open and close the electrical sensing circuit in response to spool condition of a seat belt retractor assembly.

Other objects will be apparent to those skilled in the art upon reading the present description, drawings and claims.

BRIEF DESCRIPTION OF THE DRAWING

FIG. 11 is a fragmental side elevation view of the invention in a seat belt retractor showing the outer surface of the fully stored coiled seat belt depressing the follower push arm plate to close a normally open sensing switch.

FIG. 12 is a partial fragmented side elevation view of the switch seen in FIG. 11 and showing the seat belt in an extended position with the follower push arm plate in a raised open position following the reduced webbing stack.

FIG. 13 is a partial fragmental side elevation view of the integral hinge sensing switch in a retractor and showing the fully stored coiled seat belt acting upon the follower push arm plate to open a normally closed sensing circuit.

FIG. 14 is a partial fragmental side elevation view of the switch and retractor in FIG. 13 and showing the switch in its normally closed position with the follower push arm plate in a raised open position against the withdrawn webbing stack.

GENERAL DESCRIPTION

In general, an integral hinge sensing switch assembly is provided for use in sensing a spool condition (webbing coiled on the spool) in a seat belt retractor assembly or the like. The sensing switch assembly comprises a resin switch housing having a push arm follower plate or cover integrally hinged to the housing and which plate is adapted for biased pivotal following contact with the outer surface of a seat belt or webbing coiled on the spool of a seat belt retractor assembly in register contact therewith. The push arm follower plate acting as a hinged cover is provided with an actuator pin adapted for movement into the housing when the push arm follower plate is pivotally moved toward the housing on its integral hinge in response to a build up of webbing toward full spool condition in the seat belt retractor assembly. The switch housing is provided with an actuator pin access opening in the upper surface thereof which is in register with the actuator pin extension of the push arm follower plate. A contact element is provided in said housing in actuating register with the actuator pin opening. The contact element is adapted to selectively close and open an electrical sensing circuit upon selective actuation by said actuator pin.

In one embodiment of the invention, a resilient spring leaf contact element is fixedly fulcrumed at one end thereof in the switch housing with the free end thereof being in spaced-apart register with the actuator pin access opening and the actuator pin. The spring leaf contact element is adapted to move into selected contact or disengagement with a fixed ground element in response to corresponding movement of the actuator pin thereagainst so as to selectively close and open an electrical sensing circuit which signals a full spool condition. The switch housing is provided with a T-shaped contact element access opening at one end thereof. Contact element anchor tab engaging channel portions are provided in the switch housing adjacent the contact element access opening. The resilient spring leaf contact element is provided with anchor wing tabs which extend outwardly from the sides thereof and the wing tabs are provided with teeth at the ends thereof so as to fixedly engage said anchor wing tab engaging channel portions. The spring leaf contact element is further provided with an end portion which is adapted for fixed crimped engagement with a wire lead.

DESCRIPTION OF A PREFERRED EMBODIMENT

Figure 1:
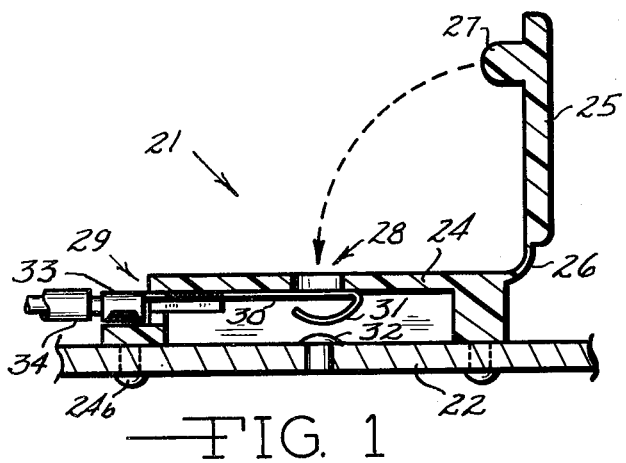
FIG. 1 is a side elevation full cross sectional view of the integral hinge sensing switch showing the integral hinge push arm plate and the spring leaf contact element positioned within the housing.
Figure 3:
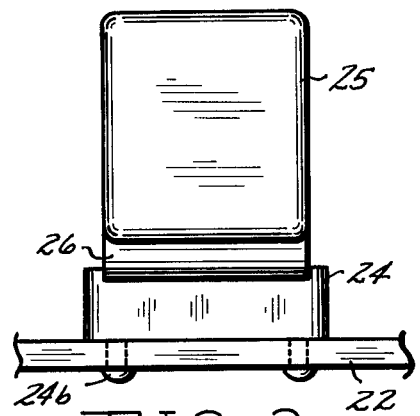
FIG. 3 is a rear elevation view of the structure of FIG. 1.
Figure 2:
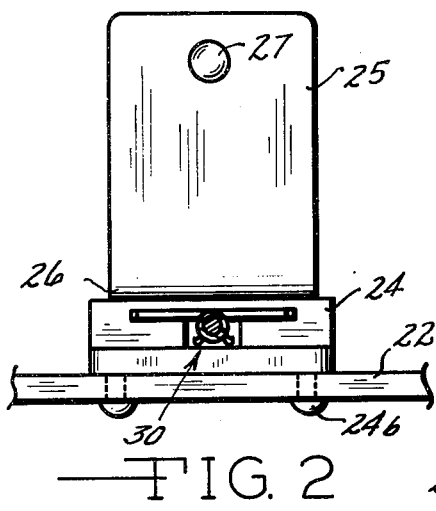
FIG. 2 is a front elevation view of the switch of the present invention showing the spring leaf contact element access slot within the housing.
Figure 4:
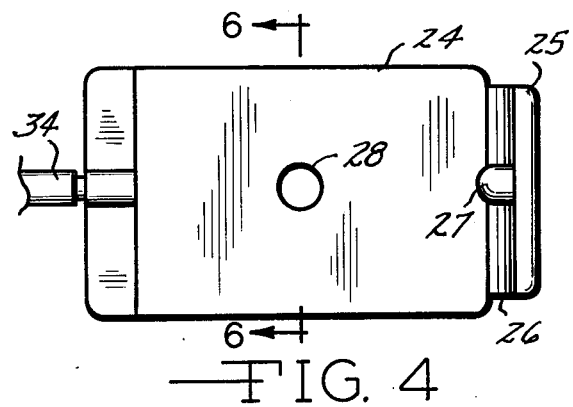
FIG. 4 is a top plan view of the structure of FIG. 1.

As shown in FIG. 1, an integral hinge sensing switch 21 is adapted for mounting upon any desired surface 22 such as a retractor frame web proximate to or within a seat belt retractor assembly 23 as shown in FIGS. 11 through 14.

The integral hinge sensing switch 21 is preferably fabricated from any suitable plastic or resin material so as to form a housing 24 and a follower push arm plate 25 acting as a cover is integrally hinged to the housing 24 by a flexible and integral connector 26. The flexible connector 26 is designed to bias the push arm plate 25 into a normally upright position as shown. The plastic material utilized to form the integral flexible connector 26, housing 24 and plate 25 is polypropylene or similar material which has inherent memory characteristics which act to return the push arm plate 25 to its normally upright position (as shown in FIGS. 1 through 5) when pressure against the push arm plate 25 is released. The push arm plate 25 is provided with an actuator pin 27 which extends outwardly therefrom as shown in FIG. 1. The housing 24 is provided with an actuator pin access opening 28 through the upper surface thereof.

Figure 6:
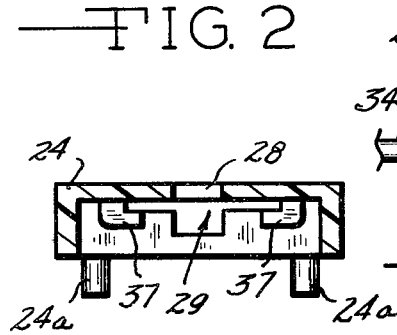
FIG. 6 is a cross-section end elevation view taken on line 6—6 of FIG. 4 with spring leaf contact element removed from the contact access opening.
Figure 8:
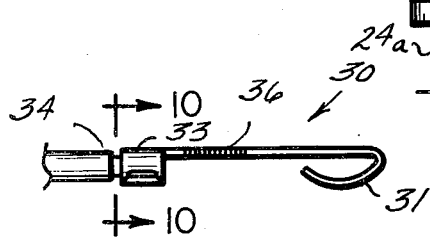
FIG. 8 is a side elevation view of the spring leaf contact element.
Figure 9:
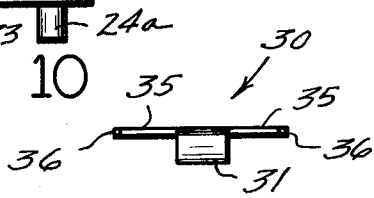
FIG. 9 is a front elevation view of the spring leaf contact element.

As shown generally in the drawings and more specifically in FIGS. 1 and 6, the housing 24 is provided with a substantially T-shaped, contact element access opening 29 at one end thereof. A spring leaf contact element 30 is inserted into the housing 24 through the access opening 29 so that the outer end portion thereof is in spaced-apart register with the actuator pin access opening 28. As shown more specifically in FIGS. 7, 8 and 9, the spring leaf contact element 30 is provided with a reverse curved contact portion 31. In its operative use position, the curved contact portion 31 is positioned intermediate to and in spaced-apart register with the actuator pin access opening 28 and the contact element 32 which, in use, would be grounded to the vehicle frame or which would comprise an electrical lead connection in a functioning circuit (not shown).

Figures 5, 7:
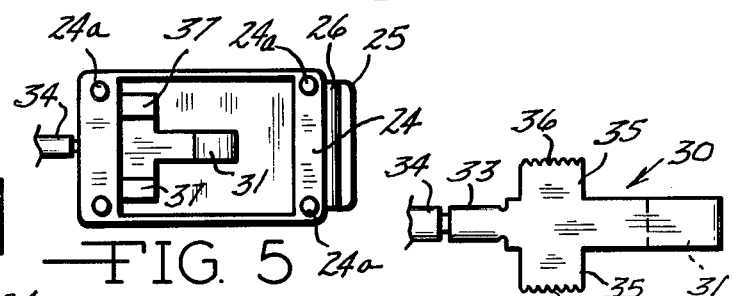
FIG. 5 is a bottom plan view of the structure of FIG. 4.
FIG. 7 is a top plan view of the spring leaf contact element.
Figure 10:
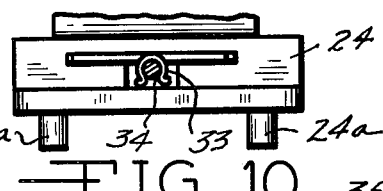
FIG. 10 is an end elevation cross-section view of the spring leaf contact element taken on line 10—10 of FIG. 8 with a portion of the switch housing added for purposes of illustration.

The housing 24, as seen in FIGS. 5, 6 and 10, includes the integral depending resin legs 24a which, upon assembly, are inserted through mounting openings and are easily upset as by application of heat to provide the heads 24b.

The spring leaf contact element 30 is further provided with a wire engaging crimpable end portion 33 which is adapted to fixedly engage the end of a wire lead 34. The wire lead 34 is electrically connected to an indicator light, actuator or warning buzzer (not shown). The spring leaf contact element 30 is provided with anchor wing tabs 35 (FIG. 7) extending outwardly from each side thereof. Each of the anchor tabs 35 are provided with toothed end surfaces 36 which are adapted to fixedly engage the inside end surfaces of channel member extensions 37 (FIG. 6) provided within the switch housing 24 adjacent the contact element access opening 29. It is thus seen that the spring leaf contact element 30 can be easily and quickly assembled into its operative use position by first crimping its end portion 33 so as to fixedly engage the end of a wire lead 34. Thereafter the spring leaf contact element 30 is easily inserted into the housing 24 through the T-shaped access slot 29 so that the toothed portions 36 of the anchor tabs 35 fixedly engage the inside end surfaces of the channel members 37. The housing 24, as shown, is produced by injection molding at high precision and with repetitive accuracy and consequent economy. The assembly is simple and the fastening is quick and secure. The resin selected should have good insulating properties and good dielectric strength.

Although a specific contact switch and housing 21 has been shown and described herein, it is within the scope of the invention to provide any type of switch such as a limit switch or relay switch within the housing which would be selectively actuated by movement of the actuator pin 27 thereagainst.

OPERATION

As shown in FIGS. 11 through 14, the assembled integral hinge sensing switch 21 is mounted proximate to a seat belt retractor assembly 23 as on a retractor frame 22. The switch 21 is positioned so that the follower push arm plate 25 is in biased following contact with the outer surface 38 of the coiled seat belt 39 stored on the retractor assembly reel or spool. Thus positioned, the push arm follower plate 25 continuously monitors the amount of rolled seat belt 39 remaining on the spool of the retractor assembly 23.

In the FIG. 11, the full spool condition of the retractor assembly 23 causes the outer surface 38 of the stored or rolled up seat belt 39 to depress the push arm follower plate 25 so that the actuator pin 27 moves through the access opening 28 to engage and depress the spring leaf contact element 30 until the contact 31 engages the ground contact 32, thus closing the electrical sensing circuit to indicate the full spool condition. As the seat belt 39 is drawn from the retractor assembly 23, the size of the seat belt roll decreases and the follower push arm plate 25 moves accordingly so that the actuator pin 27 no longer engages the spring leaf contact element 30. The spring leaf contact element 30 assumes its normally straight position thereby breaking the electrical circuit with the switch returning to its normally open position. This is shown in FIG. 12.

FIGS. 13 and 14 show another embodiment of the integral hinge sensing switch 21a which is adapted to be normally closed (FIG. 14) until a full spool condition is reached whereupon the circuit is broken and the switch is opened (FIG. 13). This is achieved by the addition of a fulcrum extension 40 provided intermediate the actuator pin 27 and the ground contact 32.

It is thus seen that an integral hinge sensing switch is provided with a follower push arm plate which is biased for pivotal following movement against the outer surface of a seat belt coiled on the spool of a seat belt retractor assembly. While the present embodiment of the invention is adapted for use with an automotive seat belt retractor assembly, it can be used in any application where it is desired to monitor, sense and indicate a spool condition, full or extended, of any material being rolled onto any type of reel or spool mechanism.

It is further seen that an integrally formed sensing switch housing and associated follower plate is provided which is simple and economical to produce due to its integral molded one-piece construction and into which a sprung leaf contact element and associated wire lead are easily assembled by a single push-insert step due to the unique design of the contact element and switch housing. The housing itself is easily installed in retractor structure drilled or pierced to receive the integral legs depending from the housing. Thus, an integral hinge sensing switch is provided which may be fabricated and assembled without the use of ancillary connector elements.

From this presentation of an operative embodiment of my invention, improvements, modifications and substitutions will become apparent to those skilled in the art. Such improvements, modifications and substitutions are intended to be included within the spirit of the invention, limited only by the scope of the hereinafter appended claims.

We claim:

1. In an integral hinge sensing switch assembly for use in sensing a seat belt spool condition in a seat belt retractor assembly and the like comprising:

a switch housing having an integrally biased push arm follower plate integrally hinged thereto, said push arm follower plate positioned in biased pivotal follower contact with the outer surface of a seat belt rolled on the spool of a seat belt retractor assembly in register therewith, said push arm follower plate provided with an actuator pin adapted for movement into said housing when said push arm follower plate is pivotally moved in response to a selected spool condition, said switch housing provided with an actuator pin access opening in the upper surface thereof in register with said actuator pin; and switch means provided in said housing in actuating register with said actuator pin opening, said switch means selectively actuated by selective movement of said actuator pin thereagainst.

2. In the integral hinge sensing switch assembly of claim 1 wherein said switch means comprise a resilient spring leaf contact element fixedly fulcrumed at one end thereof in said housing with the free end thereof in spaced-apart register with said actuator pin access opening and said actuator pin, a fixed ground element in spaced-apart register with said spring leaf contact element, said spring leaf contact element selectively movable into and out of contact with said fixed ground element in response to corresponding movement of said actuator pin thereagainst so as to close an electrical sensing circuit.

3. In the integral hinge sensing switch assembly of claim 2 wherein said switch housing has a T-shaped contact element access opening at one end thereof, said switch housing provided with contact element anchor tab engaging channel portions adjacent said contact element access opening.

4. In the integral hinge sensing switch assembly of claim 3 wherein said resilient spring leaf contact element is provided with anchor wing tabs extending outwardly from the sides thereof, said anchor wing tabs provided with teeth at the ends thereof so as to fixedly engage said anchor wing tab engaging channel portions.

5. In the integral hinge sensing assembly of claim 3 wherein said housing includes depending heat deformable legs for connecting said housing to a retractor assembly.

6. In the integral hinge sensing switch assembly of claim 2 wherein said resilient spring leaf contact element is provided with a wire lead engaging end portion, said wire lead engaging end portion adapted for fixed crimped engagement with the end of a wire lead.

* * * * *

UNITED STATES PATENT OFFICE
CERTIFICATE OF CORRECTION

Patent No. 4,031,344          Dated 1977 June 21

Inventor(s) Regis Victor Pilarski and Robert John Rumpf

It is certified that error appears in the above-identified patent and that said Letters Patent are hereby corrected as shown below:

Column 2, line 2, "Figure 6" should start a new paragraph.

Signed and Sealed this

Twenty-seventh Day of September 1977

[SEAL]

Attest:

RUTH C. MASON  
*Attesting Officer*

LUTRELLE F. PARKER  
*Acting Commissioner of Patents and Trademarks*